3,413,269
PROCESS FOR PRODUCING HIGH MOLECULAR
WEIGHT POLYOXYMETHYLENE
Shinichi Ishida and Hiromichi Fukuda, Tokyo, Japan, assignors to Asahi Kasei Kogyo Kabushiki Kaisha, Osaka, Japan, a corporation of Japan
No Drawing. Filed Dec. 23, 1964, Ser. No. 420,772
Claims priority, application Japan, Dec. 28, 1963, 38/70,495
12 Claims. (Cl. 260—67)

ABSTRACT OF THE DISCLOSURE

A process in which paraformaldehyde is irradiated with ionizing or ultra-violet rays in a closed system to produce a modified polyoxymethylene of higher molecular weight which is pyrolyzed to form formaldehyde, which in turn is polymerized to produce a high molecular weight polyoxymethylene.

---

This invention relates to a process for producing polyoxymethylene having high molecular weight and excellent thermal stability from formaldehyde, and especially to a process for producing formaldehyde to be employed for the polymerization.

It is well known that formaldehyde is polymerized to form polyoxymethylene, and substantially anhydrous formaldehyde is polymerized in the presence of an appropriate catalyst such as amines, organo-metallic compounds and other suitable compounds, so that high molecular weight polyoxymethylene having excellent thermal stability and utilizable as a raw material for molding is obtained.

The degree of polymerization of polyoxymethylene obtained varies depending on the water content in the starting material of formaldehyde in a wide range from a low molecular weight polymer such as α-polyoxymethylene to a high molecular weight polyoxymethylene.

Formaldehyde is generally obtained by pyrolysis of paraformaldehyde or a low molecular weight, solid polyoxymethylene such as α-polyoxymethylene, but the gaseous formaldehyde thus obtained contains large amounts of impurities such as water, formic acid and methanol; accordingly the formaldehyde must be purified to an extremely high degree of purity by removing those impurities, especially water in order to obtain high molecular weight polyoxymethylene having an intrinsic viscosity of 0.8~1.5 or more and excellent thermal stability which is usable as raw material for molding.

Therefore, there have been many attempts on the purification method heretofore, e.g., comprising passing gaseous formaldehyde through multiple refrigerating traps to cause it to condense, washing by contacting with polyalkylene glycolester at a temperature more than 100% C., liquefying and distilling it, or preliminary polymerization. However, there have been many disadvantages and difficulties such as much loss of formaldehyde, clogging of the apparatus and pipes, complicated recovery processes and equipment, or the expensive production cost, etc.

According to the present invention, low molecular weight polyoxymethylene, especially paraformaldehyde which will give only such an impure formaldehyde that can not produce high molecular weight polyoxymethylene is exposed to the irradiation of ionizing rays or ultra-violet rays in a closed system to yield a considerable high molecular weight and less water content polyoxymethylene, and furthermore an important fact is that the formaldehyde obtained by subjecting the paraformaldehyde thus modified to pyrolysis is highly pure and much less moist and the formaldehyde can be used for the polymerization in the form as it is to yield polyoxymethylene having excellent thermal stability and suitable for molding.

This invention includes two novel industrial steps; the first step for producing such a modified paraformaldehyde or polyoxymethylene that can produce a pure formaldehyde and therefrom high molecular weight polyoxymethylene by a simple and easy industrial process; the second step for producing high molecular weight polyoxymethylene having excellent thermal stability which is sufficient for molding material comprising subjecting the resulting paraformaldehyde or polyoxymethylene to pyrolysis and polymerizing the resulting formaldehyde by the conventional method.

The first step is the heat treatment under the irradiation of ionizing rays or ultra-violet rays. The ionizing rays include α-rays, β-rays, γ-rays and X-rays and especially the radiation from a Van der Graaff accelerator and from cobalt 60 is preferable for practical convenience.

The dose of irradiation is not necessarily limited, but excessive irradiation is meaningless. Ultra-violet rays may be those from usual ultra-violet ray generators, and are sufficient if they contain a wave-length range such as causing polymerization of the aldehyde, and have generally a wave length less than 3970 A. Ultra-violet rays obtained by mercury quartz lamp, carbon arc lamp, spark discharge in water, hydrogen discharge tube, helium discharge tube, Lyman discharge tube, etc., are employed.

Two treatment methods are applicable in the case of using radiant rays, that is, one is simultaneous heat-treatment during irradiation (in situ irradiation) and another is heat-treatment after previous irradiation (post-effect); in the former, the heat-treatment is carried out simultaneously under irradiation at a temperature between room temperature and 200° C., and in the latter, prior irradiation is carried out at a temperature between liquid nitrogen, bath temperature and room temperature, the irradiation is stopped in a given irradiation time and then the heat-treatment is carried out at a temperature between room temperature and 200° C., preferably between 50° C. and 160° C.

If ultra-violet rays are employed, it is preferable that the irradiation be carried out while being heated at a temperature between room temperature and 200° C.

Furthermore, it is effective in the case of the ultra-violet ray irradiation that a conventional photo-sensitizer is jointly used. The suitable photosensitizers include, for example, metal oxides such as zinc oxide or titanium oxide, lead chloride, tanthene type dye such as fluorescent, eosine, fuchsine, thiazol type dye such as thioflavin TG, thiazine type dye such as methylene blue, acridine type dye such as acridine yellow. Peroxides as well as mercury vapor are also used, and those are used in amounts of less than 1% based on the raw material polyoxymethylene.

The treatment time varies depending on the kind and amount of the irradiation, the desired degree of modification of the polyoxymethylene to be obtained, and the treatment temperature; accordingly it is defined by a combination of these factors. Treatment for ½~24 hours is generally convenient.

The treatment may be carried out in air, in an inert atmosphere or in an evacuated system in the presence or absence of a solvent. As the reaction medium hydrocarbons such as n-hexane, n-heptane, benzene, toluene, cyclohexane, methylcyclohexane, halogenohydrocarbons such as methylene chloride, trichloroenthane, chlorobenzene, ethers such as diethylether, dimethyloxyethane, dioxane, anisole, organic carboxylic acid esters such as ethylacetate, Cellosolve acetate, sorbitol, nitriles such as acetonitrile, benzonitrile, ketones such as acetone, methylethylketone acetophenone, mercaptans, acid anhydrides, carbon disulfide are employed, but are not especially restrictive. The amount to be used is not also limited.

The treatment must be carried out in a closed system in order to avoid the evolution of formaldehyde which occurs in an open system.

By such a treatment, modified paraformaldehyde or polyoxymethylene having an intrinsic viscosity ranging from 0.4 to 0.8 is obtained. One feature of the modification by the treatment, is an increase of the molecular weight thereof. Namely, paraformaldehyde is considered to be low molecular polyoxymethylene having a degree of polymerization of 6~100, the thermal decomposition rate of which is very large, and accordingly measurement of the solution viscosity is impossible or difficult, and would be very small even if it was measured.

However, measurement of the viscosity of polyoxymethylene obtained by above-said modification treatment is possible and the polymer can be recovered by reprecipitation. The solution viscosity of a polymer can be measured in p-chlorophenol, dimethylformamide, γ-butyrolactone and so on.

Another feature of the modified polyoxymethylene is a remarkable difference in the solubility thereof. Namely, lower polyoxymethylene or paraformaldehyde contains a water- or acetone-soluble part and is soluble in dilute alkali, and in dilute acid. On the contrary, the modified polyoxymethylene according to the present invention is insoluble in any of the above solvents.

Furthermore, a change of melting range is observed. The starting material is an unstable substance having a melting range from 120° C. to 170° C., whereas the modified material is a higher polyoxymethylene having a sharp melting point in the range from about 170° C. to about 176° C. or around 183° C.~186° C.

Still further, the water content of the modified polyoxymethylene is extremely decreased compared with that of the starting material, down to several fractions or several ten fractions thereof.

Although the pressure in this closed system is elevated by the autogeneous pressure due to heating, a gas such as nitrogen may be pressurized into the system or the reaction may be caused to start after evacuating the system by isolating the system from the outer atmosphere.

Although we have not yet established any theory about the mechanism of the modification according to the process of the present invention, polyoxymethylene with low molecular weight or paraformaldehyde used as starting material of the present invention apparently undergoes the desired modification without changing its appearance. That is, a lower molecular weight polyoxymethylene introduced into a modification reaction system does not decompose into formaldehyde to be polymerized again to the modified paraformaldehyde, but changes into the desired modified form while maintaining the appearance of a white solid powder in the medium during the course of conversion.

Even when the reaction is carried out at a higher temperature than the melting point of the starting material, the low polyoxymethylene melts to a liquid but does not change into monomeric aldehyde condensate in a closed system.

Accordingly, while any appropriate reaction vessel may be employed for this conversion, an autoclave with or without a stirring device may be convenient. Also, if desired, a continuous process is possible using a tubular reactor.

As starting material of the present invention, commercial paraformaldehyde with a purity as high as possible, usually with 85–95% and higher content of formaldehyde, may be employed. Furthermore, paraformaldehydes with even higher water content and a purity of less than 85% by weight may be used after drying for reducing the water content to less than 15% by weight, preferably to less than 5% by weight by a conventional process. For example, commercial paraformaldehyde may be dried in vacuo or by washing with dry hydrophilic organic solvent such as anhydrous alcohols, carboxylic anhydrides, ethers, esters, sulfoxides, ketones, lactones, amides and lactams, i.e., methyl alcohol, ethyl alcohol, propyl alcohol, isopropyl alcohol, ethylene glycol dimethylether, ethyleneglycol diethyl ether, ethyleneglycol diisopropyl ether, tetrahydrofurane, dioxane, dimethoxyethane, diethyleneglycol dimethyl ether, methyl Cellosolve, acetic anhydride, propionic anhydride, methyl acetate, diethyleneglycol dimethyl ether, methyl Cellosolve, acetic anhydride, propionic anhydride, methyl acetate, ethyleneglycol monoacetate, acetone, methyl ethyl ketone, diethyl ketone, γ-butyrolactone, propiolactone, dimethylsulfoxide, tetramethylenesulfoxide, dimethylformamide, dimethylacetamide and N-methylpyrrolidone.

At the final stage of this modifying treatment, the modified polyoxymethylene may be recovered. When the treatment comes to an end, the water separated out of the starting polyoxymethylene, remains on the wall of the reactor and the surface of polyoxymethylene, disperses and dissolves into the medium, together with methanol, formic acid, methyl formate and other impurities. To remove these impurities, the solid phase is at first separated with suitable means such as drying filtration, centrifugation and decantation, washed with a suitable liquid such as alcohol, ketone, hydrocarbon, ether, water and the solvent for the catalyst used and finally dried under atmospheric or subatmospheric pressure or in a stream of inert gas.

The polyoxymethylene thus recovered has the appearance of white powder or flakes with little or no appreciable odor of formaldehyde.

The polyoxymethylenes with molecular weights in higher range acquires an excellent heat stability when acetylated: a film or a sheet may be obtained therefrom by heating and melting between hot plates followed by cooling. However, the molecular weight usually is not yet high enough to be used for a mould.

Another important feature of the present invention exists in that the thus modified polyoxymethylene is heated so as to induce the decomposition to formaldehyde, which is then converted to polyoxymethylene with much higher molecular weights. Unexpectedly, we have noted that formaldehyde caused to generate from the modified polyoxymethylene by heating contains no water and thus very easily yields polyoxymethylenes with excellent heat stability and high molecular weights, when polymerized in a conventional polymerization system.

Thus, we have established an industrially feasible process of producing useful polyoxymethylene requiring neither complicated equipment nor subtle operative conditions for dehydrating and purifying gaseous or liquefied formaldehyde as had been a common practice in the conventional processes, by using the modified polyoxymethylene according to the present invention.

Any of the known processes may be employed for the heat decomposition. For example, powder, pellets or flakes of the modified polyoxymethylene may be easily decomposed by heating unprotected or protected with an inert gas or an inert organic vapor, or suspended in a medium of organic compound with high boiling point. If desired, a small amount of catalyst such as sulfuric acid, phosphoric acid or phosphoric anhydride may be present in the decomposing zone.

The temperature in the decomposing zone should be regulated to slightly higher than that in the modifying zone, usually in the range from 80° to 300° C., preferably in the range from 100° to 250° C.

The gaseous formaldehyde generated by the heat decomposition is sent to a polymerization zone through a conduit, preferably with a carrier gas, though the conduit is rarely clogged owing to the high purity of generated formaldehyde.

Thereafter, the gaseous formaldehyde is either liquefied by directly cooling same or absorbed into a solvent, and then polymerized.

The polymerization process per se is not the essential feature of the present invention: the polymerization may be effected according to conventional processes using catalysts such as various amines, ammonium compounds, organometallic compounds, carboxylic acids and their metal salts, isonitrile or organophosphorus compounds. It was found that the polyoxymethylenes produced by the present process have thermal stability, molecular weight and moulding properties never inferior to those of the products obtained from formaldehyde strictly purified according to the conventional complicated processes. Furthermore, the present process is more advantageous than conventional processes in the point of simplified and easily controllable steps as well as the simplified equipment.

The process of this invention is summarized in Table I using the results of the experiment.

TABLE I

| Polymer | Specific viscosity of polymers (1 g./100 ml. in p-chlorophenol) | Thermal stability [1] |
| --- | --- | --- |
| Polyoxymethylene made from formaldehyde obtained from commercial 95% purity paraformaldehyde. | [2] 0.1~0.5 | Bad. |
| Modified paraformaldehyde (polyoxymethylene) according to the present process, obtained from the same above 95% purity polyoxymethylene. | 0.2~0.7 | Somewhat good. |
| Polyoxymethylene obtained from formaldehyde produced by pyrolysis of above-said modified paraformaldehyde (polyoxymethylene). | >0.7 | Good. |

[1] The measurement was carried out by comparing the thermal decomposition on a heated plate at 180° C.
[2] The value may be somewhat inaccurate due to decomposition.

The present invention will be further illustrated in detail while referring to the following specific examples, which should not be construed as limiting the spirit and the scope of the present invention to be defined in the claims.

So long as not otherwise specified, the amounts in the examples was represented in term of part by weight and the viscosity, in term of the solution viscosity $\eta_{sp.}/c$ measured with a solution containing 1 g. of polymer in 100 ml. of p-chlorophenol as solvent at 60° C.

EXAMPLE 1

100 parts of commercial paraformaldehyde (purity 95%) were charged in a tube which was sealed in vacuo, and exposed to 400 curies $\gamma$-ray from cobalt 60 at a dose rate of $5.1 \times 10^4$ r./hr. at 100° C., a total dose of $2.44 \times 10^6$ r. Then the tube was opened and the contents removed. Half of the content was poured into 500 parts of aqueous 10% sodium sulfite solution and stirred at room temperature for one hour. The resulting precipitate was filtered under suction, washed sufficiently with anhydrous methanol, and evacuated overnight to yield 20 parts of modified polyoxymethylene having a viscosity of 0.15. The remaining 50 parts were subjected to pyrolysis without any treatment. Namely, this one was subjected to pyrolysis at 140° C. under a dry nitrogen stream dissolved into toluene at −20° C., mixed with phenylisonitrile as catalyst in an amount of 0.01 mol percent based on absorbed formaldehyde, and then polymerized. Commercial paraformaldehyde was also subjected to pyrolysis and then polymerization in the same way as in above. The result is shown in Table II.

TABLE II

| Raw material | Yield of polymerization (percent) | Viscosity |
| --- | --- | --- |
| Commercial paraformaldehyde untreated | 32 | [1] 0.41 |
| Above-said commercial paraformaldehyde treated with $\gamma$-ray and sodium sulfite extraction | 76 | 1.71 |
| Above-said commercial paraformaldehyde treated with $\gamma$-ray | 69 | 1.21 |

[1] Somewhat inaccurate by decomposition.

EXAMPLE 2

50 parts of methylene chloride were mixed with 100 parts of commercial paraformaldehyde. The mixture was charged in a tube and sealed in vacuo and exposed to 400 curies of $\gamma$-ray from cobalt 60 at a dose rate of $5.1 \times 10^4$ r./hr. at 100° C., a total dose of $2.44 \times 10^6$ r.

Thereafter, the tube was opened and the contents were washed with methanol, dried in vacuo, and subjected to pyrolysis to yield gaseous formaldehyde. The formaldehyde was passed through a heating tube, and then through a washing bottle containing 400 cc. of anhydrous toluene at room temperature, and absorbed to dissolve into toluene at −20° C. to yield an 8.5% formaldehyde solution.

0.0025 wt. percent of tri-n-butylamine as the catalyst was added thereto, and polymerization was carried out for 5 hours. The polymerizate was washed with acetone, and dried to yield 62 parts of white powdered polymer. Its viscosity was 1.42.

On the other hand, formaldehyde obtained by pyrolysis, in the same conditions as the above, of commercial paraformaldehyde was polymerized under the same conditions as described above to yield a polymer having a viscosity of only 0.41. The former could be formed to film after being acetylated, whereas the latter could not be formed to a shaped article because of decomposition.

EXAMPLE 3

100 parts of commercial paraformaldehyde were charged in a tube, sealed in vacuo and subjected to the irradiation of 400 curies of $\gamma$-ray from cobalt 60 at a dose rate of $5.1 \times 10^4$ r./hr. a total dose of $1.22 \times 10^6$ r.

The irradiation was stopped, and the contents were heated in an oil bath at 100° C. for 48 hours. The insoluble part was collected, washed with water and then anhydrous methanol, and dried in vacuo to yield 32 parts of modified polyoxymethylene having a viscosity of 0.32. This was subjected to pyrolysis at 140° C. under a nitrogen stream, and dissolved to be absorbed into toluene. 0.01 mol percent of phenylisonitrile was added thereto at −20° C. Polymerization was carried out for 4 hours. The viscosity of polyoxymethylene obtained was 1.62. The primary decomposition rate at 222° C. was 2.11%/min. The specific viscosity of the product obtained by esterifying the above-said polyoxymethylene with acetic acid anhydride in presence of pyridine was 1.71. The primary thermal decomposition rate at 222° C. was 0.16%/min. This product could produce a strong film.

EXAMPLE 4

50 parts of Cellosolve acetate were mixed with 100 parts of commercial paraformaldehyde, charged in a tube, sealed in vacuo and subjected to the irradiation of 400 curies of $\gamma$-ray from cobalt 60 at a dose rate of $5.1 \times 10^4$ r./hr. at 40° C., a total dose of $1.22 \times 10^6$ r.

Thereafter the irradiation was stopped. The contents were heated at 100° C. on an oil bath for 48 hours, taken out of the tube, washed with anhydrous methanol, dried and subjected to pyrolysis and polymerization in the same way as in Example 3 to yield a high molecular weight polyoxymethylene having a specific viscosity of 1.67.

EXAMPLE 5

Commercial paraformaldehyde was immersed in anhydrous methanol, washed, and dried in vacuo. 100 parts of thus obtained paraformaldehyde free from the adsorption water were mixed with 50 parts of Cellosolve acetate, charged in a tube, sealed in vacuo and subjected to the irradiation of 400 curies of $\gamma$-ray from cobalt at a dose rate of $5.1 \times 10^4$ r./hr. at −20° C., a total dose of $1.4 \times 10^5$ r. Thereafter the irradiation was stopped and the mixture heated at 100° C. for 48 hours on an oil bath. After being opened, the contents were washed with anhydrous diethyl ether and dried to yield polyoxymethylene having a viscosity of 0.64. Gaseous formaldehyde obtained by subjecting the above-said polyoxymethylene to pyrolysis at 140° C. under a nitrogen stream was introduced with stirring, into n-heptane containing 0.0025 wt. percent of n-butylamine to polymerize at 30° C. The polymer produced was washed with n-heptane, and dried at 50° C. for 8 hours in vacuo to yield 62 parts of white powdered polymer. The specific viscosity was 1.72.

EXAMPLE 6

Commercial paraformaldehyde was charged in a tube, sealed in vacuo and irradiated with γ-rays from a Van der Graaff accelerator at a dose rate $2.0 \times 10^5$ r./sec. at 20° C. for 5 minutes at the working condition of a electrode potential 1.5 mev. and a beam current 50 ma. and thereafter heated on an oil bath at 100° C. for 48 hours. After being opened, the contents were dried to yield a polyoxymethylene having a viscosity of 0.4. Thereafter polymerization was carried out in the same way as in Example 3 to yield high molecular weight polyoxymethylene having a viscosity of 1.89.

EXAMPLE 7

Commercial paraformaldehyde was charged in a tube, sealed in vacuo and irradiated with X-rays in front of the window of an X-ray generator working at 220 kv. and 20 ma. at 15° C. for 5 hours. The irradiation was stopped and the contents were heated at 100° C. for 48 hours. The contents of the opened tube were treated and polymerized in the same way as in Example 1 to yield polyoxymethylene having a specific viscosity 1.41.

EXAMPLE 8

100 parts of paraformaldehyde were mixed with 20 parts of Cellosolve acetate. Into the vessel containing the above mixture, a low pressure mercury lamp (1 mm. Hg) was inserted. The content was heated at 100° C. under irradiation with stirring. After treating for 10 hours, the contents were washed with anhydrous methanol, dried in vacuo and polymerized in the same way as in Example 2 to yield 60 parts of polyoxymethylene having a specific viscosity of 1.21.

EXAMPLE 9

100 parts of commercial paraformaldehyde (95% purity) which is soluble in sodium sulfite solution were charged in an autoclave equipped with a low pressure mercury lamp (1 mm. Hg), heated at 110° C. with shaking for 4 hours. Thereafter the contents were taken out, poured into 100 parts of 10% sodium sulfite aqueous solution and heated at room temperature for 1 hour with stirring. The insoluble part was filtered under suction, washed with water, and dried in vacuo at 50° C. over night to yield 20 parts of a white powdered polymer. The specific viscosity ($\eta_{sp./c.}$) of the polymer; concentration of 1% in p-chlorophenol at 60° C. was 0.23.

EXAMPLE 10

10 parts of commercial paraformaldehyde were mixed with 5 parts of methylene chloride, and charged into a reaction vessel equipped with a low pressure mercury lamp (1 mm. Hg) and heated at 100° C. for 20 hours with stirring. After being opened, the contents were taken out, washed with methanol, then with 10% sodium sulfite solution, thereafter with water and dried to yield 2.6 parts of polyoxymethylene. The specific viscosity of polyoxymethylene was 0.31.

EXAMPLE 11

10 parts of commercial paraformaldehyde were mixed with 5 parts of a mixed xylene, irradiated in vacuo with radiation from a tubular low pressure mercury lamp (1 mm. Hg) at 120° C. for 10 hours with stirring. The treatment was carried out in the same manner as in Example 2 to yield 6.2 parts of polyoxymethylene having a specific viscosity of 0.30.

EXAMPLE 12

10 parts of commercial paraformaldehyde were mixed with 20 parts of anisole, and the mixture was irradiated at 120° C. with radiation from a high pressure mercury lamp (10 mm. Hg in the same autoclave as in Example 1 for 8 hours, and treated in the same manner as in Example 2 to yield 4.8 parts of polyoxymethylene having a specific viscosity of 0.33.

EXAMPLE 13

Commercial paraformaldehyde was immersed in anhydrous methanol, allowed to stand overnight, filtered under suction, washed with anhydrous ether and dried in vacuo. The resulting paraformaldehyde (10 parts) was mixed with 5 parts of anhydrous Cellosolve acetate, and the mixture was irradiated at 120° C. with ultraviolet ray from a low pressure mercury lamp (1 mm. Hg) for 48 hours. Thereafter, same was treated in the manner of Example 1 to yield 7.2 parts of modified polyoxymethylene having a specific viscosity of 0.72.

EXAMPLE 14

10 parts of paraformaldehyde were mixed with 5 parts of acetophenone. The mixture was treated in the same manner as in Example 4 to yield 3.2 parts of sodium sulfite solution insoluble polyoxymethylene.

EXAMPLE 15

10 parts of paraformaldehyde were mixed with 0.01 part of eosine and 10 parts of toluene, and the mixture was treated for 30 hours in the same manner as in Example 1 to yield 7 parts of polyoxymethylene having a specific viscosity of 0.62.

What we claim is:

1. A process for producing a high molecular weight polyoxymethylene which comprises irradiating paraformaldehyde with rays selected from the group consisting of ionizing rays and ultra-violet rays in a closed system to produce a modified polyoxymethylene having an intrinsic viscosity of 0.4 to 0.8, pyrolizing the thusly modified polyoxymethylene to form formaldehyde and polymerizing the formaldehyde to produce a high molecular weight polyoxymethylene.

2. A process according to claim 1, wherein irradiation is effected with an ionizing ray selected from the group consisting of α-rays, β-rays, γ-rays and X-rays.

3. A process according to claim 1, wherein irradiation is effected with ultra-violet rays of a wave length shorter than 3970 A.

4. A process according to claim 1, wherein a less than 1% by weight based on the low molecular weight polyoxymethylene of a photosensitizer is used when irradiation is effected with ultra-violet rays.

5. A process according to claim 1, wherein the irradiation and pyrolysis are effected in an atmosphere selected from the group consisting of air and an inert gas.

6. A process according to claim 1, wherein the paraformaldehyde contains at most 15% by weight of water.

7. A process according to claim 5 wherein irradiation and pyrolysis are effected under a reduced pressure.

8. A process according to claim 7 wherein irradiation and pyrolysis are effected in the presence of a solvent.

9. A process according to claim 6 wherein the paraformaldehyde contains at most 5% by weight of water.

10. A process according to claim 1 wherein irradiation is effected with an ionizing ray, and irradiation and pyrolysis are effected simultaneously at a temperature between room temperature and 200° C.

11. A process according to claim 1 wherein irradiation is effected with ultra-violet rays, and irradiation and pyrolysis are effected simultaneously at a temperature between room temperature and 200° C.

12. A process according to claim 1 wherein irradiation is effected with an ionizing ray at a temperature between that of liquid nitrogen and room temperature and pyrolysis is thereafter effected at a temperature between room temperature and 200° C.

References Cited

UNITED STATES PATENTS

| | | | |
|---|---|---|---|
| 3,169,840 | 2/1965 | Wood | 55—29 |
| 3,287,414 | 11/1966 | Fukui et al. | 260—606 |
| 3,343,931 | 9/1967 | Doyle | 44—7 |
| 2,768,994 | 10/1956 | MacDonald | 260—67 |
| 3,093,560 | 6/1963 | Fourcade | 204—159.21 |
| 3,107,208 | 10/1963 | Chachaty | 204—159.21 |

FOREIGN PATENTS 663,987   5/1953   Canada.

WILLIAM H. SHORT, *Primary Examiner.*

L. M. PHYNES, *Assistant Examiner.*